United States Patent
Cahen et al.

(10) Patent No.: US 8,002,146 B2
(45) Date of Patent: Aug. 23, 2011

(54) DRINK DISPENSING DEVICE WITH HOLDING AND DRIP-COLLECTING SYSTEM FOR RECEPTACLES OF DIFFERENT SIZES

(75) Inventors: Antoine Cahen, Lausanne (CH); Philippe Cahen, Lausanne (CH); Christophe S. Boussemart, Lugrin (FR)

(73) Assignee: Nestec S.A., Vevey (CH)

(*) Notice: Subject to any disclaimer, the term of this patent is extended or adjusted under 35 U.S.C. 154(b) by 298 days.

(21) Appl. No.: 11/764,503

(22) Filed: Jun. 18, 2007

(65) Prior Publication Data
US 2008/0148950 A1  Jun. 26, 2008

(30) Foreign Application Priority Data
Jun. 16, 2006 (EP) .................................. 06115568

(51) Int. Cl.
*B67D 1/16* (2006.01)
*B67D 1/00* (2006.01)

(52) U.S. Cl. ............ 222/108; 222/173; 99/275; 141/86; 141/88

(58) Field of Classification Search .............. 99/317, 99/275; 202/108, 173; 141/86, 87, 88, 89; 222/108, 173, 250
See application file for complete search history.

(56) References Cited

U.S. PATENT DOCUMENTS

| | | | | |
|---|---|---|---|---|
| 1,256,206 A | * | 2/1918 | Cordley | 222/108 |
| 4,687,119 A | * | 8/1987 | Juillet | 221/101 |
| 5,161,455 A | * | 11/1992 | Anson et al. | 99/280 |
| 5,167,392 A | * | 12/1992 | Henricksen | 248/311.2 |
| 5,353,692 A | | 10/1994 | Reese et al. | 99/289 |
| 6,619,607 B2 | * | 9/2003 | Yamada | 248/311.2 |

FOREIGN PATENT DOCUMENTS

| | | |
|---|---|---|
| CH | 487636 | 3/1970 |
| DE | 20 2004 020 983 | 7/2006 |
| EP | 0 549 887 A2 | 7/1993 |
| EP | 549887 A2 * | 7/1993 |
| WO | WO 2004/023950 | 3/2004 |

* cited by examiner

*Primary Examiner* — Henry Yuen
*Assistant Examiner* — Jianying Atkisson
(74) *Attorney, Agent, or Firm* — Winston & Strawn LLP

(57) ABSTRACT

A drink preparing device that includes a box and a holding and drip-collecting system that comprises a holding part positionable beneath a drink outlet in order to accept a first, relatively small receptacle, and being configured and dimensioned to be moveable between a deployed holding position suitable for accepting the small receptacle and a second position in which the part is moved at least partly out of the way of the drink outlet to create an unoccupied space in which a second, larger receptacle can be positioned, in place of the first receptacle, beneath the drink outlet.

18 Claims, 3 Drawing Sheets

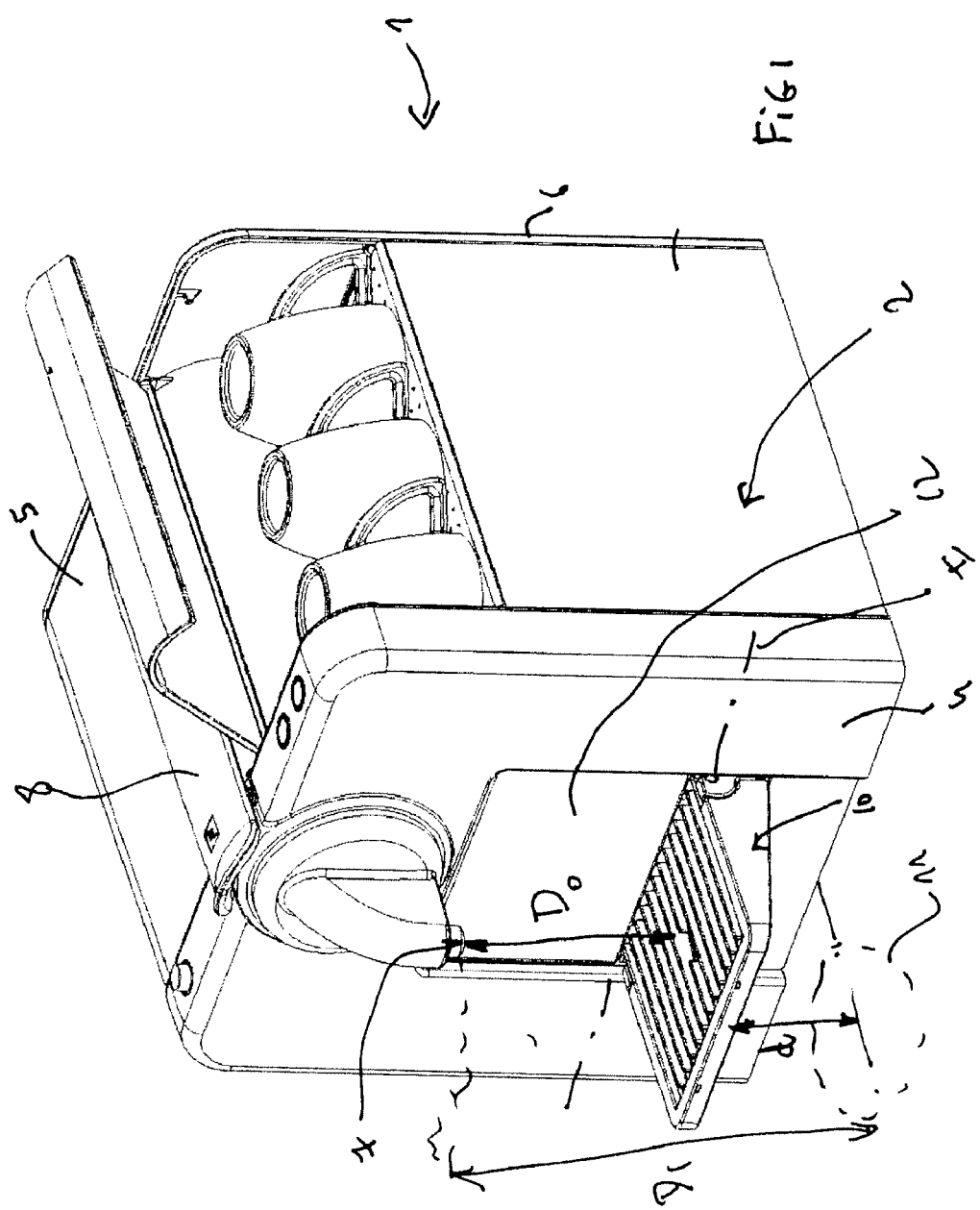

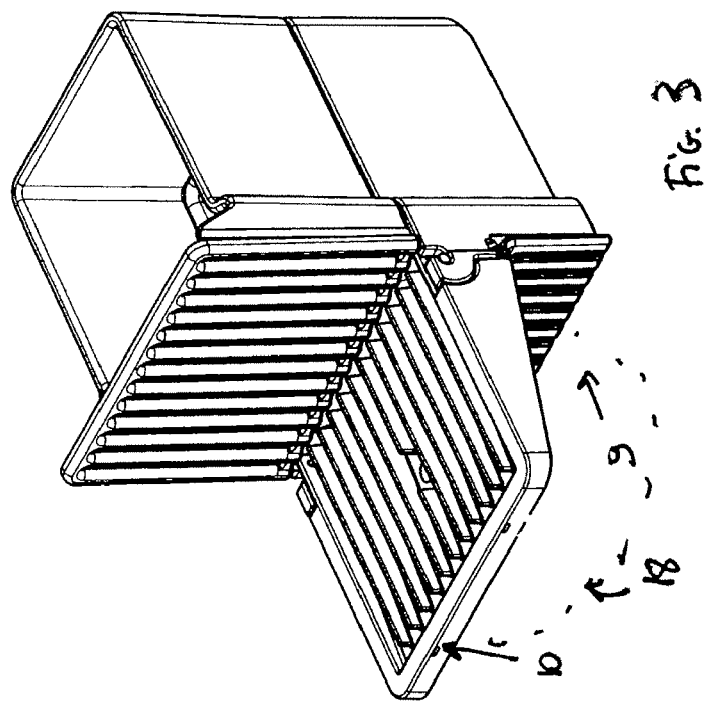
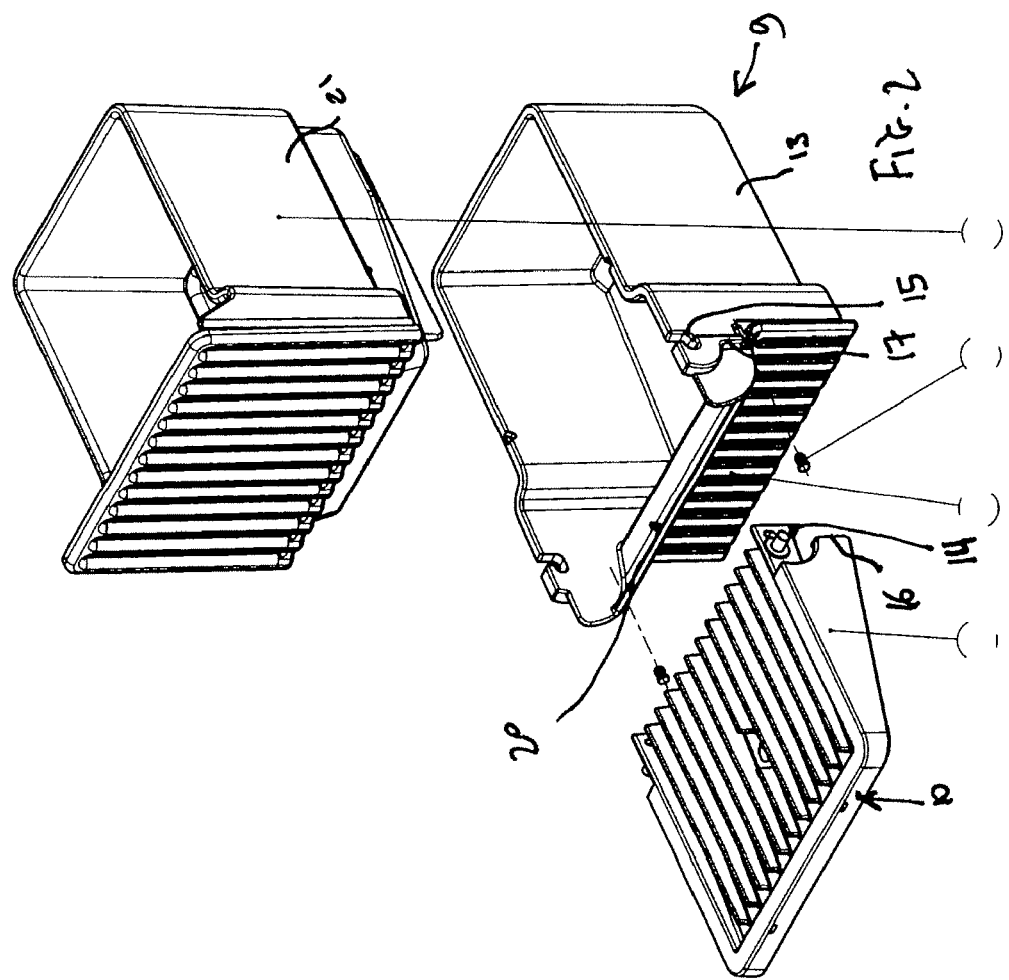

DRINK DISPENSING DEVICE WITH HOLDING AND DRIP-COLLECTING SYSTEM FOR RECEPTACLES OF DIFFERENT SIZES

BACKGROUND

The present invention relates to a drink dispensing device, such as a coffee machine, having a drip-collecting system suitable for receptacles of different sizes.

There is a consumer demand for drink dispensing machines, such as coffee machines, that can deliver a variety of drinks in receptacles of different sizes. For example, some coffee machines are capable of preparing an espresso coffee or a lungo coffee in a small or medium cup and a "macchiato" coffee in a large glass.

It is also important to maintain a short distance between the drink outlet and the receptacle in order to produce a good quality froth (the "crema") for a coffee, besides avoiding the risk of spatter. What is required, therefore, is a system that will prevent the user from choosing the wrong holder and from setting an incorrect distance between the drink outlet and the receptacle.

Furthermore, it is also important to provide an effective drip-collecting system in order to keep the service area reasonably clean. It is important, too, to provide an easy-to-use system without technical complexity. The system must also be easy to maintain. Existing prior-art devices do not really achieve these desirable features.

Certain devices are made up of several holding parts on top of each other. The user has to manipulate one or more of these parts in order to adapt the holder correctly to the desired receptacle size, and the collected liquid may be spilt. There is also the risk of the user not setting the receptacle at the correct distance from the outlet for the dispensed drink. For example, he may choose to use a holder which is too low for coffee served in a cup. Thus, there is a need for improved devices of these types.

SUMMARY OF THE INVENTION

The present invention now provides a solution that will meet the abovementioned requirements and solve the problems of the prior art. For this purpose, the invention relates to a drink preparing device, such as a coffee machine, that includes a drink outlet. The device comprises a box and a holding and drip-collecting system that comprises a holding part positionable beneath a drink outlet in order to accept a first, relatively small receptacle, and being configured and dimensioned to be moveable between a deployed holding position suitable for accepting the small receptacle and a second position in which the part is moved at least partly out of the way of the drink outlet to create an unoccupied space in which a second, larger receptacle can be positioned, in place of the first receptacle, beneath the drink outlet.

The cup holding part is preferably associated with the box as a cantilever projection when the holder of the first receptacle is in the deployed position. Also, the holding part may be configured and positioned for rotation between the deployed position and the second position. For this, holding part may be hinged about an axis of rotation allowing the part to be moved upwards and out of the way. Alternatively, the holding part may be hinged in such a way that it can be moved at least partly toward the second position during the positioning of the taller receptacle and the cup holder is also configured and dimensioned to fall back by gravity beneath the drink outlet when the user removes the taller receptacle away from the drink outlet.

The system may further comprise a liquid collecting tray arranged to receive liquid collected by the holding part when the holding part is moved to the second position. The holding part and collecting tray may be joined together to form a drawer which is removable from the box. In addition, the device may include a device for locking the holding part in the second position. This locking device may be configured to release the holding part automatically in the second position. Also, the holding part may be locked in the second position in such a way as to fall back under gravity into the deployed position when released by the locking device. Preferably, the locking means includes an on/off means.

If desired, the holding part may be movable along or into a housing in the base. When intended, the device may further comprise a housing into which the holding part is inserted by a sliding action.

BRIEF DESCRIPTION OF THE DRAWING FIGURES

FIG. 1 is a perspective view of a device according to the invention;

FIG. 2 shows a detail of the holding and collecting system according to the invention, in an exploded view;

FIG. 3 shows a detail of the holding and collecting system according to the invention, assembled in drawer form;

DETAILED DESCRIPTION OF THE PREFERRED EMBODIMENTS

Figure 4:
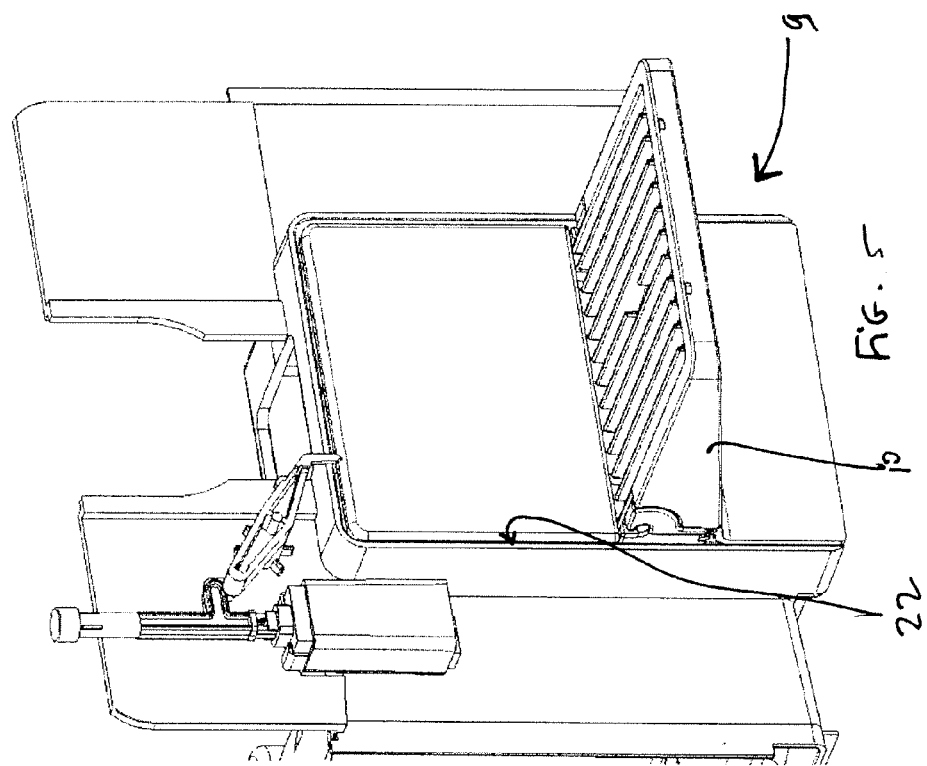
FIG. 4 is a detail perspective view of part of the device in which the holding and drip-collecting system is in the locked position.

As noted above, in a preferred embodiment, the cup holding part preferably projects cantilever-fashion from the box when the holder of the small receptacle is in the deployed position and is designed to be able to be moved out of the way to create a space in which a larger receptacle can be positioned underneath the drink outlet. Also, the holding part preferably projects cantilever-fashion at a predetermined vertical distance from the lower plane of the box. For example, the distance may be such that a small receptacle cannot move the holding part sufficiently out of the way, whereas a large receptacle is capable of moving said part out of the way.

Thus, in accordance with the inventive concept, the holding and collecting means used for the small receptacle (such as a cup) is moved out of the way simply when a large receptacle is used. It can thus be moved out of the way by the receptacle itself—a large glass, for example. This principle also ensures the ideal distance for delivering the drink because it prevents any confusion in the control of the positioning of the receptacle underneath the drink outlet.

In one possible embodiment, the holding part is rotatable. It is preferably rotated upwards and out of the way by the placement of a receptacle tall enough to push against the holding part and thus keep it out of the way. For example, the holding part may be hinged to the device on an essentially horizontal axis of rotation allowing said part to be moved upwards and out of the way.

The holding part is preferably hinged to the device in such a way that it can be moved at least partly out of the way during the positioning of a larger receptacle and can fall back under gravity underneath the drink outlet when the user removes said receptacle. The last few drips falling from the drink outlet can thus be collected by the holding part itself when the user removes the large receptacle from the service area.

In accordance with another possible aspect, the system comprises a liquid collecting tray arranged to receive liquid collected by the holding part at the moment when the latter is moved out of the way. The holding part can thus be emptied at regular intervals, thus reducing the risk of liquid overflow, improving the cleanliness of the device and reducing hygiene problems.

In a preferred construction, the holding part and the collecting tray are joined together to form a drawer which is removable from the box. In this form, the holding part can be hinged removeably to the collecting tray itself or to any other component connected to the drawer. This modular drawer concept makes for easier maintenance and allows cleaning of the whole of the holding and collecting system.

The device of the invention may also comprise a device for locking the holding part in its fully out-of-the-way position. The locking device may be designed to release the holding part automatically in the deployed position. When the locking device is released, the holding part can drop back, for example, under gravity to the deployed position. Locking may be useful particularly when carrying out maintenance and/or when the device is not in use, so that it takes up less space. The return of the holding part to its position may be automatic, in the sense of not requiring the user to manipulate the holder itself. This would reduce the risk of the user trying to use a small receptacle when the part is still locked in the raised or out-of-the-way position.

In a preferred embodiment, the locking means are controlled by the "on/off" power supply means of the device. More specifically, when the device is turned on by using the on button, the pressure on the button unlocks the locking means. The control of the locking means by the button may be mechanical, electromagnetic and/or electrical in nature for example.

The invention is not necessarily limited to a holding part designed to rotate. Another possible embodiment is one in which the part is moved out of the way by other means such as by sliding it in the manner of a drawer into a housing inside the device.

With reference to the drawing figures, the drink preparing device bears the reference 1 and will be referred to simply as a "coffee machine" in the remainder of the description. The coffee machine according to the invention comprises a box 2 which will cover various assembled parts such as an internal frame 3 (illustrated in FIGS. 2-3) to which various external panels 4, 5, 6 are fitted. The machine comprises a drink outlet 7 which may take various forms. The machine may also include, for example, means 8 for closing the brewing or percolation module.

Since the brewing or dilution technique is not the subject of the invention, it is not necessary to describe it. As an example, the machine may comprise internally a brewing module for brewing, dissolving and/or diluting the ingredient under pressure and delivering it through the drink outlet. The ingredient is preferably contained in a closed package such as a capsule, a sachet or any other package suitable for the machine.

The device according to the invention comprises a system 9 for holding the receptacle and collecting drips. The system is formed by a holding part 10 which goes underneath the drink outlet and projects cantilever-fashion from the machine. "Projects cantilever-fashion" means that the holding part continues from the device in at least one direction and is not supported from beneath, thus forming a sort of balcony. The holding part is placed at a predefined distance D from the drink outlet for the optimum drip distance when accepting small or medium-size receptacles (meaning, for example, cups capable of holding approximately 25, 40 or 110 mL respectively). The part is thus at a distance "d" from the placement surface 11 on which a larger receptacle is placed when the part is moved out of the way by the receptacle. The placement surface or receptacle holder may be virtual, that is, it may simply be the surface of a kitchen table or other surface that is not part of the machine itself, or "real", meaning part of a supporting surface of the machine itself. However, the invention aims to simplify the machine and therefore there is no need to provide a holder specially for the larger receptacle (hereinafter referred to as a "large glass"), as will be explained later.

The holding part 10 is thus freely rotatable about an axis of rotation I relative to the box. The holding part can be raised up out of the way, in which case a large glass can be put in position. The large glass simply pushes the holding part up out of the way. It may be lifted only part of the way so that the holding part is not entirely housed in the housing 12 provided in the box. The drink outlet 7 is also designed such that the distance D1 between the outlet and the placement surface 11 is optimal for a large glass, in order in particular to limit the risk of spatter and give the drip a short path so as not to destroy the layer of foam forming (or already formed) in the glass.

FIGS. 2 and 3 show the holding and collecting system 9 on its own. The system takes the form of a drawer assembly. A first collecting tray 13 is provided to collect liquid from the holding part 10. The holding part is hinged removably onto the side faces of the collecting tray 13 by means of pins 14 which fit into slots 15 in the faces. On the sides of the holding part are bearing surfaces 16 located underneath the axis of rotation in order to bear against the front surfaces 17 of the tray. The holding part is thus supported in a projecting position without occupying a space 18 underneath the part. The holding part is firm and can take a cup of small or medium-size capacity. On the front, the drip tray may have a trough 20 which advances underneath the holding part and assists with liquid collection.

A second collecting tray 21 for coffee capsules can be fitted onto the first collecting tray 13. Once installed in the machine, the tray 21 is designed to collect the used capsules ejected by the brewing module.

The holding and collecting system 9 according to the invention forms a single modular block which can easily be disengaged from the box by simply sliding it out, for example, thereby facilitating maintenance, that is emptying out both liquid and used capsules and cleaning the trays out.

Figure 5:
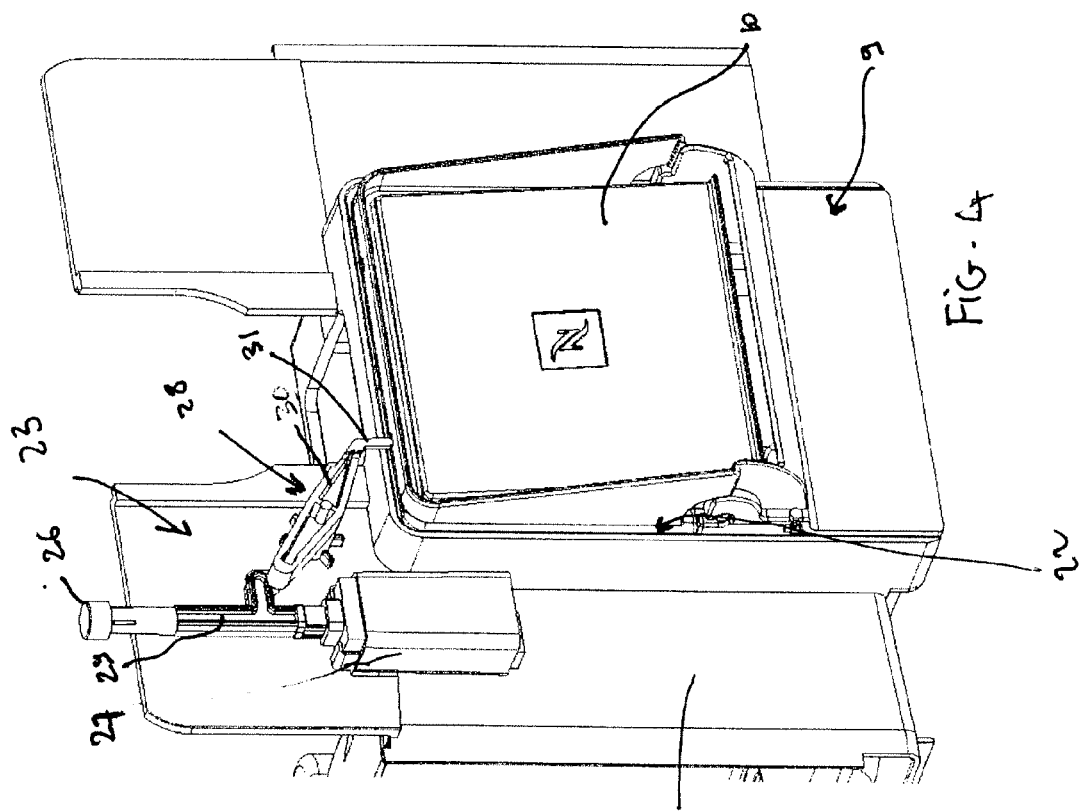
FIG. 5 is a detail view of part of the device with the system deployed to accept small or medium-size receptacles.

As shown in FIGS. 4 and 5, the holding and collecting system 9 engages with a sliding action into a housing 22 in the box of the machine. Once in place, the system is functionally and aesthetically integrated into the rest of the machine.

The machine also preferably comprises a locking device 23 for locking the holding part 10 in a fully retracted or out-of-the-way position, as for example at least partly in the housing 22. Any locking means may be considered, such as mechanical or electromagnetic means. In a preferred embodiment, the locking device comprises locking means connected to a control means. The control means acts on the locking means to release the holding part when desired. The holding part is then released and can rotate into its deployed position (FIG. 5).

The control means preferably includes the machine's on/off button 26 for turning the machine on. This means is, as known per se, connected to an electric switch 27 for powering the electrical and electronic components of the machine (boiler, pump, electronic control, etc.) when desired. In this particular case, the on/off button 26 is connected mechanically to a catch 28 formed, for example, by a mechanical pusher 29 that activates a rocker 30 connected to a retention pin 31 acting to retain the front edge of the holding part 10. The rocker part 30 may be provided with elastic means (such as a spring) for the automatic return of the pin to the locked position following removal of the pressure from the on/off button as shown in FIG. 5.

The advantage of connecting the locking of the holding part in the retracted position to the on/off control is that it avoids the situation in which the user is able to prepare a drink in a small container even though the holding part is in the locked position. When the user wishes to make a drink of coffee in a cup, for example, as opposed to in a large glass, he must first press the on/off button, which opens the lock and releases the holding part. On the other hand, if he wishes to make a drink in a large glass, he has simply to push the holding part 10 out of the way with an upward rotation using the large glass.

What is claimed is:

1. A drink preparing device for dispensing a drink into a relatively smaller receptacle or into a relatively larger receptacle, the device comprising
   a box; and
   a holding and drip-collecting system that comprises a cup holding part positioned beneath a drink outlet and configured and dimensioned to be freely moveable by rotation between a more horizontal, deployed holding position and a second, more vertical, retracted position outside of the box, wherein the cup holding part projects cantilever fashion when the holder part is in the deployed holding position for holding the relatively smaller receptacle beneath the drink outlet, and wherein the cup holding part is hinged about an axis of rotation allowing the cup holding part to be freely moved upwardly and out of the way to the retracted position in which the cup holding part is moved at least partly out of the way of the drink outlet, so that the placement of the relatively larger receptacle beneath the drink outlet physically contacts and pushes the cup holding part so as to freely rotate it upwards and towards the retracted position while the removal of the relatively larger receptacle beneath the drink outlet permits the cup holding part to freely rotate back under gravity to the deployed holding position, wherein the cup holding part is further configured and dimensioned for receiving the relatively smaller receptacle beneath the drink outlet without the need to push the cup holding part upwards and out of the way of the drink outlet.

2. The device according to claim 1 wherein the cup holding part comprises a liquid collecting tray arranged to receive liquid collected by the cup holding part when the cup holding part is moved to the second position.

3. The device according to claim 2 wherein the cup holding part and the collecting tray are joined together to form a drawer which is removable from the box.

4. The device according to claim 1 which further comprises
   a locking device for locking the cup holding part in the second position; and
   an on/off means having an on button which must be activated in order to prepare a beverage from the drink preparing device and which is configured to automatically release the cup holding part concurrently with pressure on the on button.

5. The device according to claim 4 wherein the locking device is configured to release the cup holding part automatically in the second position.

6. The device according to claim 5 wherein the cup holding part is locked in the second position in such a way as to fall back under gravity into the deployed position when released by the locking device.

7. The device according to claim 1 wherein the cup holding part further comprises a drawer which is movable along or into a housing in the base.

8. The device according to claim 7 which further comprises a housing into which the cup holding part and drawer are inserted by a sliding action.

9. The device according to claim 7
   wherein the cup holding part when in the second position contacts the drawer, and
   wherein the drawer is configured and dimensioned to receive liquid collected by the cup holding part when the cup holding part is moved to the second position and to receive used capsules from which the beverage has been prepared, such that the removal of the drawer from the box or housing enables the used capsules and liquid to be removed and discarded from the device.

10. The device according to claim 1 wherein the cup holding part comprises a bearing surface for supporting the cup holding part in the deployed holding position.

11. The device according to claim 1 wherein the cup holding part engages a seat in the box.

12. The device according to claim 1 wherein the second relatively larger receptacle can be placed on a table or other surface that supports the device but is not part of the device, or on a base that is a part of the device.

13. A drink preparing device for dispensing a drink into a relatively smaller receptacle or into a relatively larger receptacle, the device comprising
   a box;
   a holding and drip-collecting system that comprises a cup holding part positioned beneath a drink outlet and hinged, configured and dimensioned to be moveable
      between a lower, deployed holding position suitable for holding the relatively smaller receptacle beneath the drink outlet in order to collect liquid; and
      a second, raised position outside of the box in which the cup holding part is moved at least partly out of the way of the drink outlet so that the relatively larger receptacle can be positioned beneath the drink outlet in order to collect liquid; and
   a liquid collecting tray which is joined to the cup holding part to form a drawer removable from the box and which is arranged to receive liquid collected by the cup holding part when the cup holding part is moved to the second position;
   wherein the cup holding part moves upwardly and at least partly toward the second position by contact with the larger relatively receptacle during the positioning of the relatively larger receptacle beneath the drink outlet and falls back by gravity to the deployed position beneath the drink outlet when the larger receptacle is moved away from the drink outlet.

14. A drink preparing device for dispensing a drink into a relatively smaller receptacle or into a relatively larger receptacle, the device comprising:
   a box; and
   a holding and drip-collecting system that comprises a cup holding part positioned beneath a drink outlet and hinged, configured and dimensioned to be moveable between a lower, deployed holding position suitable for holding the relatively smaller receptacle beneath the drink outlet in order to collect liquid, and a second, raised position outside of the box in which the cup holding part is moved at least partly out of the way of the drink outlet so that the relatively larger receptacle can be positioned beneath the drink outlet in order to collect liquid;

wherein the cup holding part is pivotable upwardly to the second, raised position wherein the cup holding part is disposed in a substantially vertical position upon contact with the larger receptacle, but the part can freely fall back under gravity underneath the drink outlet when the larger receptacle is removed, and the cup holding part is associated with a drawer configured and dimensioned to receive liquid from the part when in the substantially vertical position and to receive used capsules from which the beverage has been prepared, such that the removal of the drawer from the box or housing enables the used capsules and liquid to be removed and discarded from the device, and further wherein the cup holding part in the substantially vertical position contacts the drawer.

15. The device of claim 13 wherein the drawer is configured and dimensioned to receive liquid collected by the cup holding part when the cup holding part is moved to the second position and to receive used capsules from which the beverage has been prepared, such that the removal of the drawer from the box or housing enables the used capsules and liquid to be removed and discarded from the device.

16. A drink preparing device for dispensing a drink into a relatively smaller receptacle or into a relatively larger receptacle, the device comprising a box; and a holding and drip-collecting system that comprises a cup holding part positioned beneath a drink outlet and configured and dimensioned to be freely moveable so that the absence of a relatively larger receptacle beneath the drink outlet permits the cup holding part to fall freely back to a more horizontal, deployed holding position suitable for holding the relatively smaller receptacle beneath the drink outlet, and the presence of the relatively larger receptacle beneath the drink outlet physically pushes the cup holding part into a second, more vertical, retracted position outside of the box in which the cup holding part is moved upwardly and at least partly out of the way of the drink outlet;

wherein the cup holding part is pivotable upwardly from the more horizontal, deployed holding position to the second, retracted position wherein the cup holding part is disposed in a substantially vertical position upon contact with the larger receptacle, but the cup holding part can freely fall back under gravity underneath the drink outlet when the larger receptacle is removed, and wherein the cup holding part is associated with a drawer configured and dimensioned to receive liquid from the cup holding part when in the substantially vertical position and to receive used capsules from which the beverage has been prepared, such that the removal of the drawer from the box or housing enables the used capsules and liquid to be removed and discarded from the device, and further wherein the cup holding part in the substantially vertical position contacts the drawer.

17. The device according to claim 3 wherein the box further comprises a trough to assist in directing liquid from the liquid collecting tray into the drawer.

18. The device according to claim 14 wherein the box further comprises a trough to assist in directing liquid from the liquid collecting tray into the drawer.

\* \* \* \* \*